US012711308B2

(12) United States Patent
Lin et al.

(10) Patent No.: US 12,711,308 B2
(45) Date of Patent: Aug. 18, 2026

(54) SYSTEM AND METHOD FOR KNOWLEDGE-BASED AUDIO-TEXT MODELING VIA AUTOMATIC MULTIMODAL GRAPH CONSTRUCTION

(71) Applicant: Robert Bosch GmbH, Stuttgart (DE)

(72) Inventors: Wei-Cheng Lin, Pittsburgh, PA (US); Ho-Hsiang Wu, Morrisville, NC (US); Shabnam Ghaffarzadegan, Livermore, CA (US); Luca Bondi, Pittsburgh, PA (US); Abinaya Kumar, Pittsburgh, PA (US); Samarjit Das, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 18/646,202

(22) Filed: Apr. 25, 2024

(65) Prior Publication Data

US 2025/0335705 A1 Oct. 30, 2025

(51) Int. Cl.
*G06F 40/289* (2020.01)
*G06F 16/65* (2019.01)
(Continued)

(52) U.S. Cl.
CPC .............. *G06F 40/20* (2020.01); *G06F 16/65* (2019.01); *G06F 16/685* (2019.01); *G06F 40/289* (2020.01)

(58) Field of Classification Search
CPC ........ G06F 40/20; G06F 40/30; G06F 40/289; G06F 40/279; G06F 40/40; G06F 40/35;
(Continued)

(56) References Cited

U.S. PATENT DOCUMENTS 11,861,320 B1 * 1/2024 Gajek ..................... G06F 40/40
12,242,503 B1 * 3/2025 Kelsey ................. G06F 40/284
(Continued)

FOREIGN PATENT DOCUMENTS

DE 10047212 A1 4/2002
DE 10307840 B3 6/2004
(Continued)

OTHER PUBLICATIONS

Chen et al., "A Survey on Multimodal Knowledge Graphs: Construction, Completion and Applications", Mathematics 2023, 11, 1815, pp. 1-27. (Year: 2023).*
(Continued)

*Primary Examiner* — Vijay B Chawan
(74) *Attorney, Agent, or Firm* — BROOKS KUSHMAN P.C.

(57) ABSTRACT

Knowledge-based audio-text modeling via automatic multimodal graph construction is performed. An audio dataset is received, the audio dataset including clips of audio data, wherein each of the clips of the audio data is paired with corresponding metadata descriptive of the audio contents of the respective clip of the audio data. Graph nodes of interest are identified from a sematic network, the graph nodes being descriptive of semantics of the knowledge domain of the contents of the audio dataset. A large language model (LLM) is utilized for categorizing the metadata into the graph nodes and for inferring supplemental data for the graph nodes for which there is no metadata, producing an extracted knowledge graph. The extracted knowledge graph is validated utilizing the LLM to perform relation verification of edges between the graph nodes of the extracted knowledge graph, thereby mitigating hallucination effects in the categorizing and inferring of the supplemental data.

23 Claims, 6 Drawing Sheets

(51) Int. Cl.
*G06F 16/683* (2019.01)
*G06F 40/20* (2020.01)

(58) Field of Classification Search
CPC ...... G06F 40/56; G06F 40/205; G06F 40/216; G06F 40/295; G06F 40/284; G06F 16/65; G06F 16/685; G06F 16/3329; G06F 16/3344; G06F 16/258; G06F 16/243; G06F 16/383; G06F 16/33295; G06F 3/165; G06F 3/167; G06N 20/00; G06N 5/022; G06N 3/0475; G06N 3/042; G10L 15/22; G10L 15/063; G10L 13/08; G10L 15/1815; G10L 25/30; G10L 25/48; G10L 25/51; G10L 15/183; G10L 17/22
USPC ............................................................ 704/9
See application file for complete search history.

(56) References Cited

U.S. PATENT DOCUMENTS

| | | | | |
|---|---|---|---|---|
| 12,243,513 | B2 * | 3/2025 | Zhu | G06N 3/0895 |
| 12,340,238 | B1 * | 6/2025 | Stănescu | G06F 9/451 |
| 12,379,948 | B1 * | 8/2025 | Vlasceanu | G06F 9/453 |
| 12,412,138 | B1 * | 9/2025 | Geene | G06Q 10/0633 |
| 12,437,188 | B2 * | 10/2025 | Cantrell | G06T 11/00 |
| 12,450,887 | B1 * | 10/2025 | Etemadi | G06V 10/82 |
| 2021/0287103 | A1 * | 9/2021 | Bangalore | G06F 40/30 |
| 2022/0050864 | A1 * | 2/2022 | Osmon | G06N 5/02 |
| 2022/0377431 | A1 * | 11/2022 | Lerner | H04N 21/4394 |
| 2023/0067177 | A1 * | 3/2023 | Ding | G06N 5/02 |
| 2023/0071799 | A1 * | 3/2023 | Ramnani | G06N 20/00 |
| 2024/0037328 | A1 * | 2/2024 | Jiang | G06F 40/232 |
| 2024/0289395 | A1 * | 8/2024 | Zhou | G06F 16/9532 |
| 2024/0354586 | A1 * | 10/2024 | Cummings | G06N 20/00 |
| 2024/0370709 | A1 * | 11/2024 | Siebel | G06N 3/047 |
| 2024/0370769 | A1 * | 11/2024 | Sheth | G06N 20/00 |
| 2024/0394176 | A1 * | 11/2024 | Pean | G16H 70/20 |
| 2024/0412720 | A1 * | 12/2024 | Vasylyev | G06F 16/90332 |
| 2024/0419912 | A1 * | 12/2024 | Somech | G06N 3/044 |
| 2025/0068667 | A1 * | 2/2025 | Blum | G06F 16/345 |
| 2025/0110975 | A1 * | 4/2025 | Shea | G06F 16/3329 |
| 2025/0140246 | A1 * | 5/2025 | Lee | H04L 65/1089 |
| 2025/0217209 | A1 * | 7/2025 | Pedersen | G06F 9/541 |
| 2025/0217576 | A1 * | 7/2025 | Mann | G06F 40/216 |
| 2025/0217585 | A1 * | 7/2025 | Jain | G06F 40/20 |
| 2025/0217673 | A1 * | 7/2025 | Silver | G06N 20/00 |
| 2025/0225572 | A1 * | 7/2025 | Chiu | G06Q 20/12 |
| 2025/0238629 | A1 * | 7/2025 | Malkiel | G06F 40/194 |
| 2025/0240494 | A1 * | 7/2025 | Avendano | H04N 21/4852 |
| 2025/0245872 | A1 * | 7/2025 | Cokely | G06F 16/58 |
| 2025/0259080 | A1 * | 8/2025 | Wang | G06N 5/022 |
| 2025/0284721 | A1 * | 9/2025 | Agrawal | G06F 16/3329 |
| 2025/0285348 | A1 * | 9/2025 | Cantrell | G06F 16/383 |
| 2025/0293998 | A1 * | 9/2025 | Courcelle | G06N 3/0895 |
| 2025/0307690 | A1 * | 10/2025 | Hoffer | G06N 20/00 |
| 2025/0321976 | A1 * | 10/2025 | Isles | G06F 16/258 |
| 2025/0321977 | A1 * | 10/2025 | Kelsey | G06F 16/258 |
| 2025/0331085 | A1 * | 10/2025 | Gilg | G06F 3/011 |
| 2025/0335705 | A1 * | 10/2025 | Lin | G06F 16/685 |

FOREIGN PATENT DOCUMENTS

| | | | |
|---|---|---|---|
| DE | 202010013504 | U1 | 11/2010 |
| EP | 1269923 | A2 | 1/2003 |
| EP | 3584024 | A1 | 12/2019 |

OTHER PUBLICATIONS

Doh et al., "Enriching Music Descriptions with a Finetuned-LLM and Metadata for Text-to Music Retrieval", ICASSP-24, 2024 IEEE International Conference on Acoustics, Speech and Signal Processing (ICASSP), IEEE, Apr. 14, 2024(Apr. 14, 2024), pp. 826-830. (Year: 2024).*

Doh et al., "Enriching Music Descriptions with a Finetuned-LLM and Metadata for Text-to-Music Retrieval", 2024 International Conference on Acoustics, Speech and Signal Processing (ICASSP), IEEE, 2024, 5 pages.

Fan et al., "Graph Machine Learning in the Era of Large Language Models (LLMs)", IEEE Transactions on Knowledge and Data Engineering Subission, 2023, 21 pages.

Zhu et al., "LLMs for Knowledge Graph Construction and Reasoning: Recent Capabilities and Future Opportunities", arxiv.org, Cornell University Library, 2023, 18 pages.

Baker et al., "The Berkeley FrameNet Project", The 17th International Conference on Computational Linguistics, Coling, 1998, 5 pages, vol. 1.

Chia et al., "RelationPrompt: Leveraging Prompts to Generate Synthetic Data for Zero-Shot Relation Triplet Extraction", Finding of the Association for Computational Linguistics: ACL, May 2022, p. 45-57.

Dhuliawala et al., "Chain-Of-Verification Reduces Hallucination in Large Language Models", arXiv preprint arXiv:2309.11495, 2023, p. 1-19.

Liu et al., "Entity-Duet Neural Ranking: Understanding the Role of Knowledge Graph Semantics in Neural Information Retrieval", Proceedings of the 56th Annual Meeting of the Association for Computational Linguistics (Long Papers), Jul. 2018, p. 2395-2405.

Hsu et al. "Degree: A Data-Efficient Generation-Based Event Extraction Model", Proceedings of the 2022 Conference of the North American Chapter of the Association for Computational Linguistics: Human Language Technologies, Jul. 2022, p. 1890-1908.

Hamilton, "Graph Representation Learning", Synthesis Lectures on Artificial Intelligence and Machine Learning, 2020, p. 1-159, vol. 14, No. 3.

Gong et al., "Listen, Think, and Understand", Conference Paper at ICLR 2024, 2024, p. 1-29.

Jiang et al., "Active Retrieval Augmented Generation", arXiv preprint arXiv:2305.06983, 2023, 24 pages.

Kreuk et al., "AudioGen: Textually Guided Audio Generation", Conference Paper at ICLR 2023, 2023, p. 1-16.

Lan et al., "A Survey on Complex Knowledge Base Question Answering: Methods, Challenges and Solutions", Proceedings of the Thirtieth Joint Conference on Artificial Intelligence (IJCAI-12) Survey Track, Aug. 2021, p. 4483-4491.

Liu et al., "AudioLDM: Text-to-Audio Generation with Latent Diffusion Model", Proceedings of the 40th International Conference on Machine Learning, Jul. 2023, p. 1-25.

Sallam et al., "ChatGPT Utility in Healthcare Education, Research, and Practice: Systematic Review on the Promising Perspectives and Valid Concerns", Healthcare, 2023, p. 1-20, vol. 11, No. 887.

Zheng et al., "PRGC: Potential Relation and Global Correspondence Based Joint Relational Triple Extraction", Proceedings of the 59th Annual Meeting of the Association for Computational Linguistics and the 11th International Joint Conference on Natural Language Processing, Aug. 2021. p. 6225-6235.

Wei et al., "Chain-of-Thought Prompting Elicits Reasoning in Large Language Model", 36th Conference on Neural Information Processing Systems, 2022, 43 pages.

White et al., "A Prompt Pattern Catalog to Enhance Prompt Engineering with ChatGPT", arXiv preprint arXiv:2302.11382, 2023, 19 pages.

Yao et al., "Schema-Aware Reference as Prompt Improves Data-Efficient Knowledge Graph Construction", SIGIR 2023, Jul. 2023, 12 pages.

Zhang et al., "Supporing Clustering with Contrastive Learning", Proceedings of the 2021 Conference of the North American Chapter of the Association for Computational Linguistics: Human Language Technologies, Jun. 2021, p. 5419-5430.

* cited by examiner

Knowledge-Graph Construction

Knowledge-Graph Construction

SYSTEM AND METHOD FOR KNOWLEDGE-BASED AUDIO-TEXT MODELING VIA AUTOMATIC MULTIMODAL GRAPH CONSTRUCTION

TECHNICAL FIELD

Aspects of the disclosure generally relate to knowledge-based audio-text modeling via automatic multimodal graph construction.

BACKGROUND

A knowledge graph may include nodes, edges, and labels descriptive of the nodes and edges. The nodes may represent objects, such as places, people, or things. The edges may define the relationships between the nodes.

SUMMARY

In one or more illustrative examples, a method for knowledge-based audio-text modeling via automatic multimodal graph construction is performed. An audio dataset is received, the audio dataset including clips of audio data, wherein each of the clips of the audio data is paired with corresponding metadata descriptive of the audio contents of the respective clip of the audio data. Graph nodes of interest are identified from a sematic network, the graph nodes being descriptive of semantics of the knowledge domain of the contents of the audio dataset. A large language model (LLM) is utilized for categorizing the metadata into the graph nodes and for inferring supplemental data for the graph nodes for which there is no metadata, producing an extracted knowledge graph. The extracted knowledge graph is validated utilizing the LLM to perform relation verification of edges between the graph nodes of the extracted knowledge graph, thereby mitigating hallucination effects in the categorizing and inferring of the supplemental data. The knowledge graph, as validated, is utilized for downstream applications.

In one or more illustrative examples, a system for knowledge-based audio-text modeling via automatic multimodal graph construction includes one or more hardware computing devices configured to receive an audio dataset, the audio dataset including clips of audio data, wherein each of the clips of the audio data is paired with corresponding metadata descriptive of the audio contents of the respective clip of the audio data; identify graph nodes of interest from a sematic network, the graph nodes being descriptive of semantics of the knowledge domain of the contents of the audio dataset; utilize a large language model (LLM) for categorizing the metadata into the graph nodes and for inferring supplemental data for the graph nodes for which there is no metadata, producing an extracted knowledge graph; validate the extracted knowledge graph utilizing the LLM to perform relation verification of edges between the graph nodes of the extracted knowledge graph, thereby mitigating hallucination effects in the categorizing and inferring of the supplemental data; and utilize the knowledge graph, as validated, for downstream applications.

In one or more illustrative examples, a non-transitory computer-readable medium comprising instructions for a knowledge-based audio-text modeling via automatic multimodal graph construction that, when executed by one or more hardware computing devices cause the one or more hardware computing devices to perform operations including to receive an audio dataset, the audio dataset including clips of audio data, wherein each of the clips of the audio data is paired with corresponding metadata descriptive of the audio contents of the respective clip of the audio data; identify graph nodes of interest from a sematic network, the graph nodes being descriptive of semantics of the knowledge domain of the contents of the audio dataset; utilize a large language model (LLM) for categorizing the metadata into the graph nodes and for inferring supplemental data for the graph nodes for which there is no metadata, producing an extracted knowledge graph; validate the extracted knowledge graph utilizing the LLM to perform relation verification of edges between the graph nodes of the extracted knowledge graph, thereby mitigating hallucination effects in the categorizing and inferring of the supplemental data; and utilize the knowledge graph, as validated, for downstream applications.

DETAILED DESCRIPTION

Figure 1:
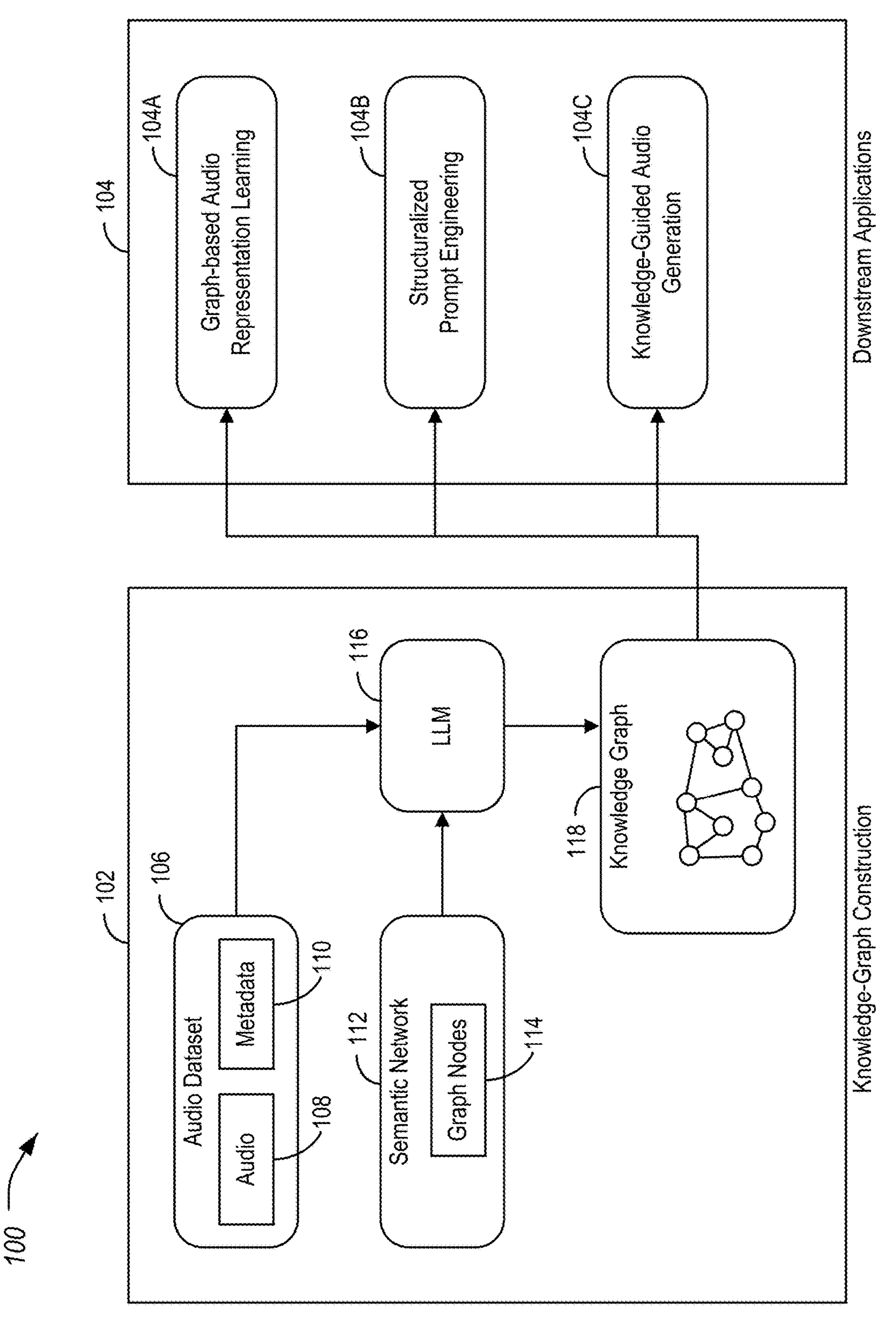
FIG. 1 illustrates an example framework for knowledge-based audio-text modeling via automatic multimodal graph construction.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Structured knowledge may be represented in the form of a knowledge graph (KG). A knowledge graph may include nodes, edges, and labels descriptive of the nodes and edges. The nodes may represent objects, such as places, people, or things. The edges may define the relationships between the nodes. The knowledge graphs may serve as a robust foundation, offering backend support for various practical applications. These practical applications may include information retrieval and question answering systems.

An object of knowledge graph construction is to automatically extract specific relations (i.e., edges) and events (i.e., nodes) from provided textual information. This is relied on high-quality knowledge annotations to retrieve KGs in a supervised manner. However, human labels are expensive and laborious to acquire, which limits the scalability of KGs and impedes them to be utilized as a universal knowledge extractor. Thankfully, the recent success of advanced large language models (LLMs) demonstrates strong capability for general language understanding and reasoning, which opens the door to leverage LLMs (e.g., ChatGPT) for the automatic construction of robust KGs with minimal human annotations.

Generative LLMs may suffer from hallucinations (e.g., sounding plausible but including incorrect factual information) or fabrications of their generated content. These issues may cause generated text to mislead users or to cause further error accumulations in machine learning systems. Mitigating hallucination effect of LLMs is an active research topic. Various approaches may be used to resolve the issue, such as introducing additional knowledge augmentation from external resources (e.g., Internet retrieval results) or incorporating verification steps to fact-check LLMs responses through self-raising a series of verification questions.

A carefully crafted prompt is typically required to best utilize an LLM. These customized prompts are typically task-dependent, trial-based and unable to transfer across scenarios, resulting in the uncontrollable and non-predicable generated outputs. In addition, KGs and LLMs are typically applied in text-only scenarios, which has not been well-explored for the conjunction usage with audio or other multimedia signals.

KGs can summarize information with a structured format, which is an ideal option to craft the input prompts for instructing LLMs, generating effective outputs in a controllable manner to reduce hallucinations. KGs also possess the potential to tie distinct multimodal signals together, through a set of structured descriptors.

Aspects of the disclosure utilize predefined semantic frames (e.g., FrameNet) from linguists as the initialization of graph nodes for general sounds and audio descriptions, forming a meaningful audio and language multimodal KG. Additionally, a LLM is adopted as a general knowledge reasoner to interpret the relations across these structuralized nodes, resulting in an automatic graph construction process. This approach therefore provides a systematic framework to construct KGs specifically for sound/audio events based on the existing resources, without requiring additional knowledge-based human annotations. The extracted graphs can be extensively applied to different downstream applications such as representation learning, prompt engineering and generative AI, serving as the knowledge foundation for audio-text modeling.

FIG. 1 illustrates an example framework 100 for knowledge-based audio-text modeling via automatic multimodal graph construction. As shown, the framework 100 may be divided into two major components: an automatic process for knowledge-graph construction 102, and downstream applications 104 that make use of the output of the automatic process. The knowledge-graph construction 102 may utilize existing audio datasets 106, which may include audio data 108 and also metadata 110 paired with and descriptive of clips of the audio data 108. The knowledge-graph construction 102 may also utilize sematic frames 112 to define interested graph nodes 114. The audio datasets 106 and the semantic frames 112 may be provided as inputs to an LLM 116 to create an extracted knowledge graph 118. The generated multimodal KGs of the extracted graph structure 116 may then be used by the downstream application 104.

The audio datasets 106 may include audio data 108. In this context, audio data 108 refers to a digitally encoded representation of sound. The audio data 108 may be stored with configurable parameters, such as sample rate, bit depth, endianness, number of channels, and with fixed or variable bit rates. The audio data 108 discussed herein may be stored in any of various audio formats, including uncompressed formats (e.g., raw data, pulse-code modulation (PCM), waveform audio (WAV), audio interchange file format (AIFF), etc.), lossless compressed formats (e.g., free lossless audio codec (FLAC), Apple lossless audio codec (AIFF), etc.), or lossy compression formats (e.g., MPEG-1 Audio Layer 3 (MP3), advanced audio coding (AAC), windows media audio (WMA), etc.).

The audio datasets 106 may also include metadata 110 descriptive of the audio data 108. In general, the audio datasets 106 may include pairs of audio data 108 and metadata 110, where the metadata 110 takes the form of textual language descriptions, either as complete sentences or as class labels. The metadata 110 of the audio dataset 106 may include target human labels and/or other available attributes that can be associated together. These human labels and additional attributes provide rich contexts about the audio samples.

Sources of the metadata 110 may be considered into two main categories: (i) human annotated and ground-truths, and (ii) inferred metadata from existing models (e.g., labels, attributes, and/or other forms of recognition outcomes inferred from audio and/or speech data using one or more machine learning models). Examples from the first category of (i) human annotations and ground-truths may include speech-related annotations such as speaker information (e.g., gender and age), sound event labels accompanied by extra ontology structure (e.g., music-instrument-guitar); or acoustic descriptors such as pitch and intensity extracted from the audio data.

Examples from the second category of (ii) inferred metadata from existing models may include external resources such as pretrained state-of-the-art automatic recognition models which can be utilized to create artificial attributes that might be relevant to the given audio samples. This may include, for instance, speech recognition for the spoken contents, emotion recognition for the expression style, audio classification for the scene information, or sound event detection for more granular sounding objects and their corresponding temporal information.

Semantics refer to the study of meaning in language. In this context, the sematic network 112 refer to data descriptive of the linguistic meaning of underlying words. The sematic network 112 may include a plurality of graph nodes 114 which represent objects, concepts, etc. The graph nodes 114 may be connected by directed links which represent relations between the graph nodes 114, such as events, connections, or other actions that relate to the graph nodes 114. A collection of the graph nodes 114 may be implemented as a database, list, set, graph, or other data representation that includes semantic and phonological relations between different words or sets of words of a vocabulary.

In one non-limiting example, FrameNet defines a complete set of semantic units that is useful for covering a comprehensive set of sound descriptions. The full set of the defined units may include: source, ground, place, path, manner, cause, degree, component, explanation, location, theme and noise. The composition of these units expresses sounds under a structured semantic frame. These components can be leveraged as the nodes 114 definition for KGs (e.g., as the event schema). Selecting for the interested (or task-dependent) nodes only might confine the scale of KGs but increases controllability. A pure data-driven node definition may also be feasible based on the acquired metadata by feeding the full set units into the LLMs 116 for analysis.

The LLM 116 may refer to any of various machine learning models that are trained on large datasets to understand, summarize, generate, and predict new content. As used herein, the term generative model may refer to LLMs that are specifically designed to perform the text generation task based on an initial prompt. In some examples, the LLMs are implemented using a decoder-only transformer architecture. The LLM 116 may be a model specifically trained for use in the framework 100. Or, in other examples, the LLM 116 may be a pretrained foundation model that may be utilized by the framework 100 as-is, or that may be fine-tuned to improve its performance in the specific tasks discussed herein that are performed using the framework 100. Some example LLMs 116 may include ChatGPT, Claude, Llama, Gemini, Cohere, etc., which may be available for use in different versions and model sizes.

Given the metadata 110 and defined graph nodes 114 of the semantic frames 112 noted above, the LLM 116 may be instructed to categorize per-sample metadata 110 to their corresponding nodes 114. Since available metadata 110 might not contain a full message relating to all the defined nodes 114, a series of prompting questions such as "what are the sound sources?" and "what might be the sounding sources grounded on?" may be asked to the LLM 116 to elicit complementary information for node completion.

Then, the completed sample-based graph nodes 114 and their belonging categories may be injected to the LLM 116 to allow for reasoning of relations across the nodes 114. This relating among the nodes 114 may be instructed using prompts such as "how might a given sound source relate or not relate to [something]?" As a result, a per-sample subgraph is constructed, which may be provided to the downstream applications 104 for later use. This augmented per-sample subgraph may be referred to here as the extracted knowledge graph 118.

The downstream applications 104 may perform various tasks such as graph-based audio representation learning 104A (e.g., contrastive clustering, graph neural networks (GNNs), etc.), structured prompt engineering 104B (e.g., controllable audio-caption generation), and/or knowledge-guided audio generation 104C (e.g., AudioGen, pyroomacoustics), as some non-limiting examples.

In further detail, one class of downstream application 104 includes graph-based audio representation learning. In such a downstream application 104, the auto-generated scene graph can be leveraged to construct an adjacency matrix, which is in many cases prerequisite material to train a GNN. In such an approach, knowledge relations between audio nodes can be explicitly introduced into training, forming a structured representation learning approach that reflects common sense correlation across audio samples (e.g., node embeddings) for better audio scene understanding and reasoning tasks, such as audio question-answering (AQA).

In another example class of downstream application 104, structured prompt engineering may be performed. A structured prompt engineering approach may leverage the includes graph-based audio representation learning. With the structured nodes and its representations, a text-based query can be designed via combination (e.g., mean, or weighted pooling) of node embeddings or simple concatenation of text descriptions to prompt audio foundation models (FMs) for retrieving and/or classifying audio samples at a fine-grained level.

In yet another class of downstream application 104, knowledge-guided audio generation may be performed. Existing language-based audio generation requires descriptive prompts to the model for producing more realistic audios. This manual and often tedious task can be replaced by leveraging extracted knowledge structures. By substituting nodes within the knowledge structure, diverse prompts can be generated while maintaining precise control over other irrelevant nodes. This approach offers a systematic framework for efficiently controlling the outputs of audio generation.

Figure 2:
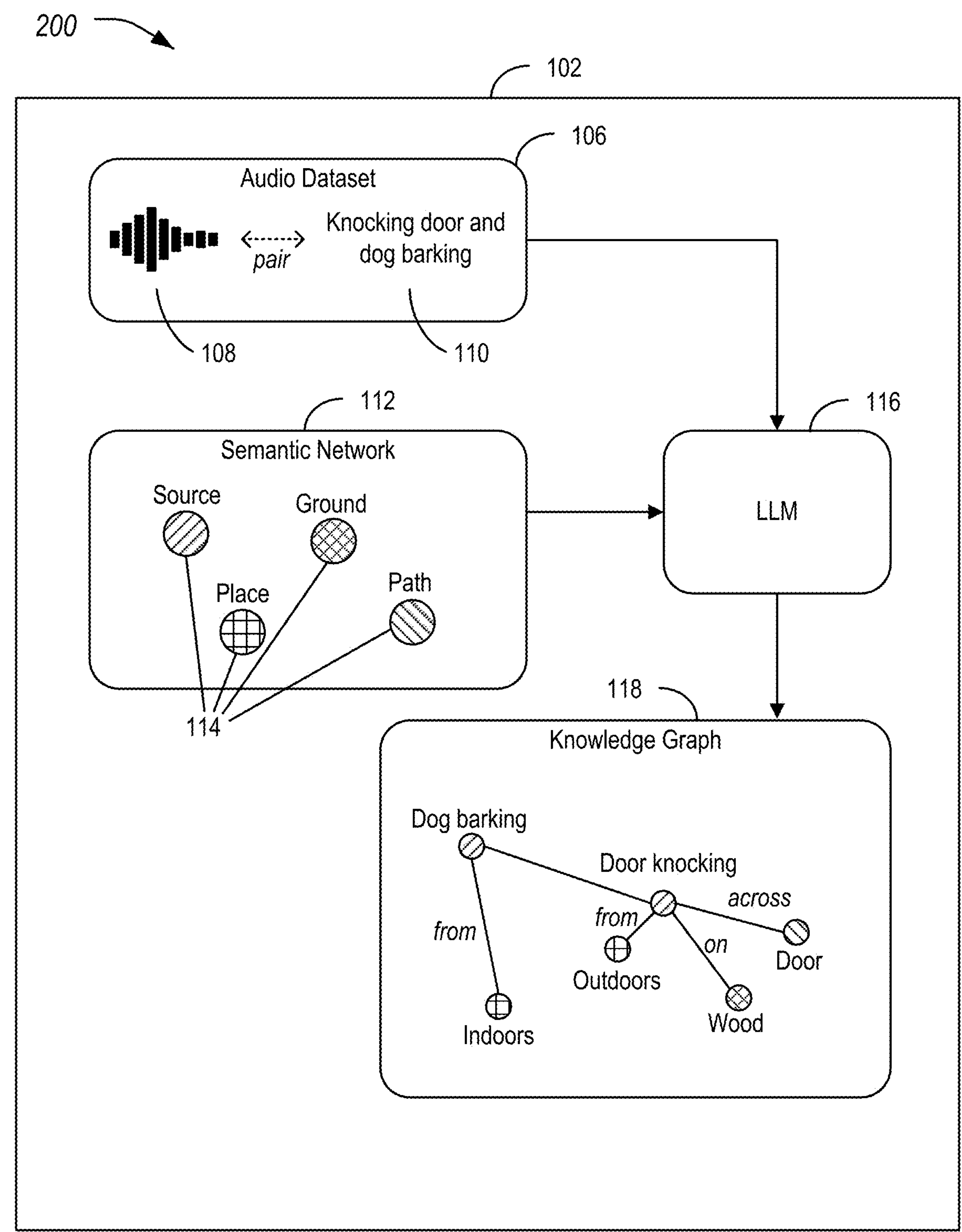
FIG. 2 illustrates an example of captioning of audio data utilizing the example framework.

FIG. 2 illustrates an example 200 of captioning of audio data 108. As shown the audio dataset 106 includes samples or clips of audio data 108 where each of the samples of audio data 108 is paired with corresponding metadata 110. This metadata 110 may include phrases or sentences that are descriptive of the sound events occurring in the corresponding audio data 108 clip. In some examples, the metadata 110 may include human-labeled captions, to provide the most accurate description of the events occurring in the audio dataset 106. As shown for an example clip of the audio data 108, the paired metadata 110 may indicate that the audio data 108 includes "Knocking door and dog barking."

Additionally, graph nodes 114 of interest are identified from the sematic network 112. These graph nodes 114 of interest may be defined directly by a user based on the user's knowledge of the domain. In another example, the graph nodes 114 of interest may be queried from the sematic network 112 based on the domain knowledge encoded in the sematic network 112. In yet another example, the graph nodes 114 of interest may be extracted from a separate database of domain knowledge. In still another example, the graph nodes 114 of interest may be posed as a question to the LLM 116, e.g., "for the domain of captioning audio, what are the most relevant elements of sound propagation?"

Regardless of approach, as shown the four basic elements of how sounds propagate are indicated as being of interest, namely: source, ground, place, and path. These may be extracted as the definition that is being used for the generation of the extracted knowledge graph 118 indicative of the sound propagation.

The audio data 108, metadata 110, and graph nodes 114 may then be fed into the LLM 116. This may allow for the identification of sound sources based on the metadata 110. Continuing with this example, the sound sources may be, e.g., "door knocking" and "dog barking," based on the metadata 110.

For any missing components as defined by the graph nodes 114, follow-up questions may be provided to the LLM 116. For instance, if no information is available about the ground graph node 114, the LLM 116 may be asked about this concept. A question such as "what material or surface might [door knocking] sound be grounded on?" could be provided as a prompt to the LLM 116. The result may then be used to fill in the ground graph node 114. In this example, the LLM 116 may have indicated "wood" for the ground graph node 114, which is incorporated into the extracted knowledge graph 118 as the information corresponding to the ground graph node 114.

Next, these categorized graph nodes 114, including the information specified by the metadata 110 and additional information inferred by the LLM 116, are reintroduced into the LLM 116. At this stage, the LLM 116 is asked to deduce connections between the graph nodes 114 (e.g., the edges between the graph nodes 114). This operation also acts as a validation measure, mitigating the potential for hallucination effects.

As shown in the resultant knowledge graph 118, two graph nodes 114 of type source are identified: "dog barking" and "door knocking." A place graph node 114 of "indoors" is inferred for the "dog barking" source graph node 114, while a place graph node 114 of "outdoors" is inferred for the "door knocking" source graph node 114. The connections of these place graph nodes 114 to their respective source graph nodes 114 is along an edge labeled "from," indicating the place from which the source originated.

A ground graph node 114 of "wood" is inferred for the "door knocking" source graph node 114. Also, a path graph node 114 of "door" is inferred for the "door knocking" source graph node 114. The connection of these ground graph node 114 to the "door knocking" source graph node 114 is along an edge labeled "on," and the connection of the path graph node 114 to the "door knocking" source graph node 114 is along an edge labeled "across." This is because the action of the "door knocking" is inferred by the LLM 116 to be performed "on" "wood," and "across" the door.

Figure 3:
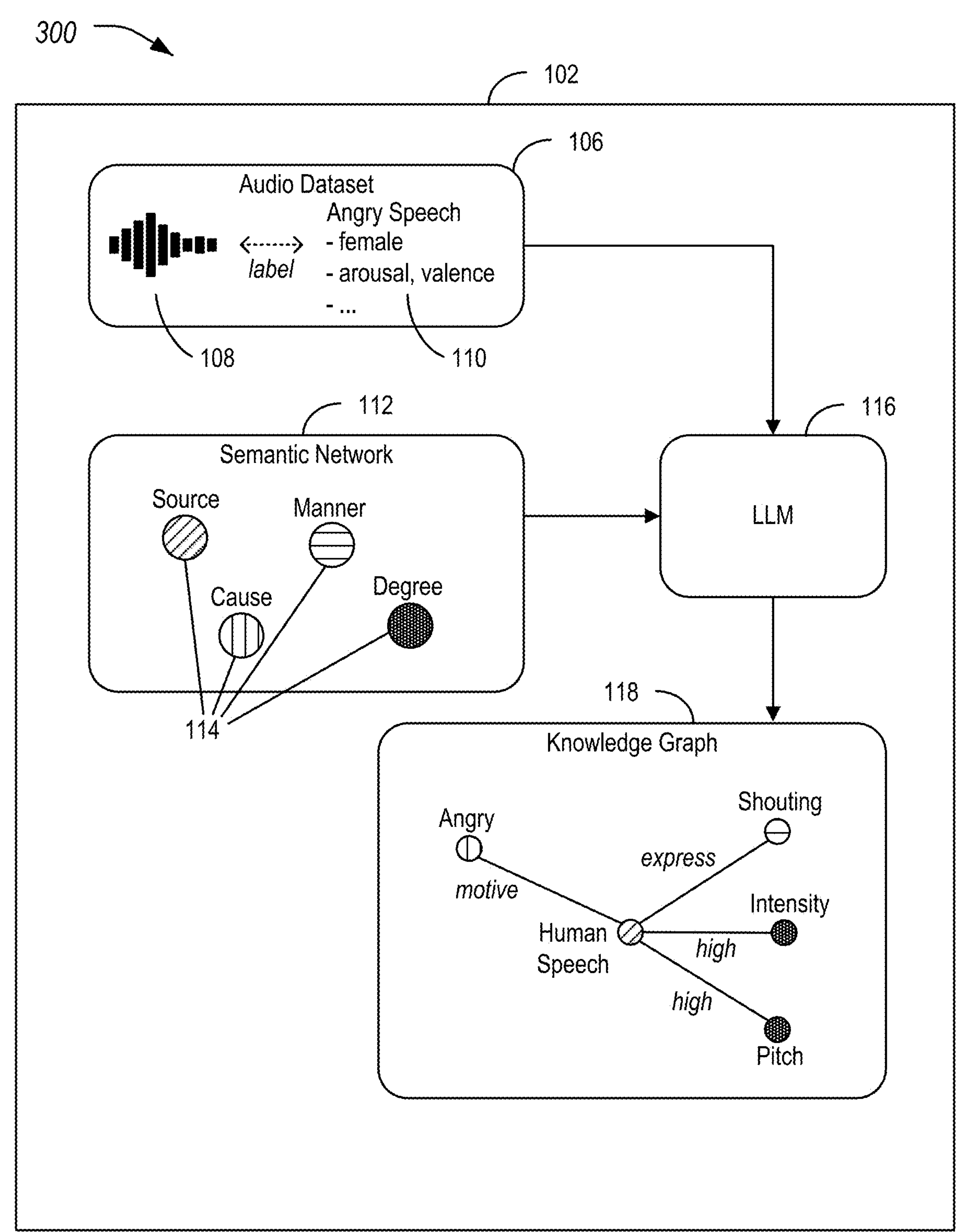
FIG. 3 illustrates an example of classification of audio data utilizing the example framework.

FIG. 3 illustrates an example of classification of audio data, here for speech emotion classification. As shown the audio dataset 106 again includes samples or clips of audio data 108 where each of the samples of audio data 108 is paired with corresponding metadata 110. Here, a set of various labels (e.g., angry), attributes (e.g., female), and emotional state scores (e.g., arousal, valence, etc.) are provided as the metadata 110 instead of complete sentences.

Additionally, graph nodes 114 of interest are identified from the sematic network 112. With the prior knowledge of a speech emotion task, the source node can be identified as "human speech." Then, the LLM 116 may be used to infer other graph nodes 114 based on the extracted metadata 110. Or, as noted above, the user's domain knowledge, a domain knowledge database, etc. may additionally or alternatively be used.

As shown, the graph nodes 114 of interest include manner, cause and degree. For instance, acoustic patterns are relevant to the degree node 114, arousal and valence scores may provide information about the manner node 114, and emotion label may indicate the cause node 114.

As previously mentioned, the initially formed knowledge graph 118 may then be reentered into the LLM 116 as a relation verification. The resultant knowledge graph 118 may include a source mode 114 of "human speech," as noted above. Connected to the source node 114 may be a cause node, here "angry" connected as a "motive" for the "human speech." Also connected to the source node 114 may be a manner node 114, here "shouting" connected as how to "express" the "human speech." Additionally, degree nodes 114 of "intensity" and "pitch" are connected to the source node 114, with edges indicating both "high" "intensity" and "high" "pitch" that correspond to the "angry" and "shouting" "human speech."

Figure 4:
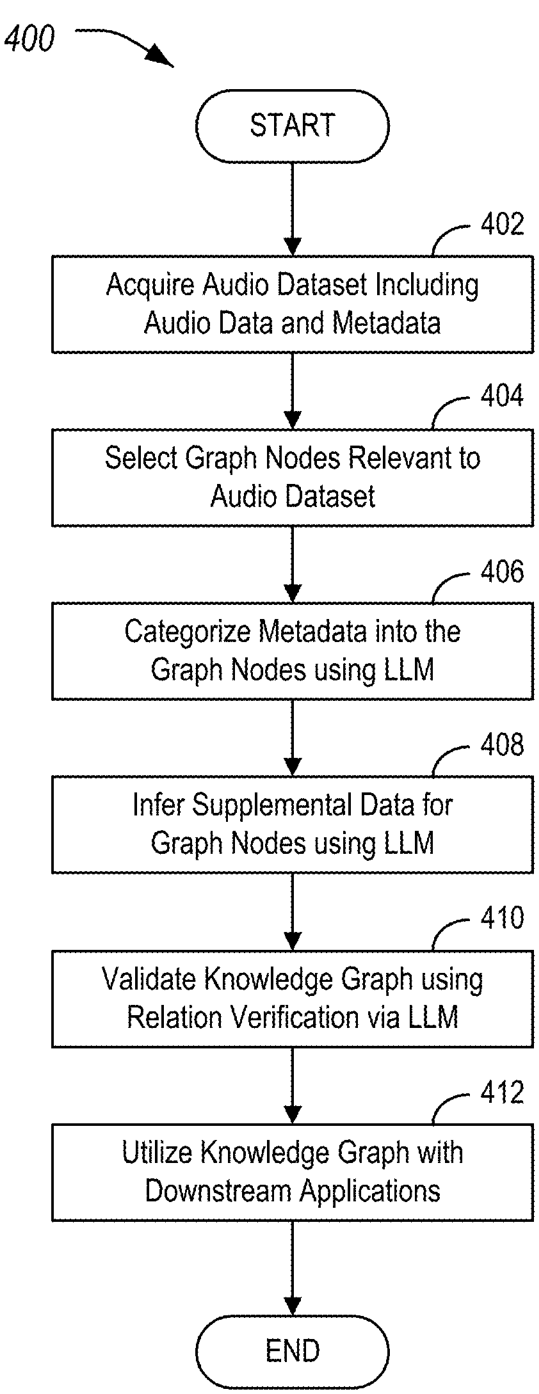
FIG. 4 illustrates an example process for performing the knowledge-based audio-text modeling via automatic multi-modal graph construction.

FIG. 4 illustrates an example process 400 for performing the knowledge-based audio-text modeling via automatic multimodal graph construction. In an example, the process 400 may be performed as an automated process executed by one or more computing devices.

At operation 402, an audio dataset 106 is received. The audio dataset 106 includes samples or clips of audio data 108 is received, where each of the samples of audio data 108 is paired with corresponding metadata 110. In some examples, the metadata 110 may include human-labeled captions, to provide accurate descriptions of the events occurring in the audio dataset 106. In some examples, instead of or in addition to the human-labeled data, machine-learned labels, attributes, and speech emotional state scores, etc., may be inferred using various machine learning models and included in the metadata 110.

At operation 404, graph nodes 114 of interest are identified from the sematic network 112. These graph nodes 114 of interest may be defined directly by a user based on the user's knowledge of the domain. In another example, the graph nodes 114 of interest may be queried from the sematic network 112 based on the domain knowledge encoded in the sematic network 112. In yet another example, the graph nodes 114 of interest may be extracted from a separate database of domain knowledge. In still another example, the graph nodes 114 of interest may be posed as a question to the LLM 116, e.g., "for the domain of [the audio dataset], what are the most relevant elements?"

At operation 406, the LLM 116 is used to categorize the metadata 110 of the audio data 108 into the graph nodes 114. In an example, the audio data 108, metadata 110, and graph nodes 114 may be fed into the LLM 116. The LLM 116 may be provided with a prompt asking the LLM 116 to categorize the given metadata 110 into the names of the indicated graph nodes 114. This may allow for the automated placement of the metadata 110 into the identified graph nodes 114.

At operation 408, the LLM 116 is used to infer supplemental data for the graph nodes 114. For example, there may be graph nodes 114 for which there is no metadata 110. In such an example, one or more prompts may be provided to the LLM 116 to cause the LLM 116 to infer content for the graph nodes 114 for which there is no metadata 110 available. In an example, if no data is available for a source node, a prompt may be provided to the LLM 116 asking what the source could be. Or, if no data is available for the location of a sound, a prompt may be provided to the LLM 116 asking the source location. This information could then be added into the graph nodes 114 as well.

At operation 410, the LLM 116 is used to perform relation verification. The operation 410 also acts as a validation measure, mitigating the potential for hallucination effects in operations such as operation 408.

At operation 412, the knowledge graph 118 is utilized with the downstream applications 104. The proposed graph construction framework 100 may be applicable to any existing resources such as audio classification (e.g., for the development of sound event detection, audio tagging models) and audio captioning (e.g., for audio retrieval task) datasets. In general, datasets comprising pairs of audio and textual language descriptions, whether in the form of complete sentences or mere class labels, are well-suited for use by the framework 100. After operation 412, the process 400 ends.

The extracted multimodal knowledge graph 118 may be beneficial for use in several audio-text modeling techniques. In one example, the knowledge graph 118 may be represented as an adjacency matrix to perform multimodal graph representation learning. In another example, the knowledge graph 118 may be used to define knowledge-based clusters for advanced contrastive learning framework.

In another example, the event schema of the knowledge graph 118 may be utilized for generating controllable text outputs via the LLM 116 (or via another LLM 116). For instance, a parameterized sound description is achieved by manipulating the nodes 114, yet still following the existing graph structure. As one possibility, to continue the example 200 of FIG. 2, the grounding object may be changed from "wood" to "metal," to indicate a different material for the "door." This strategy may serve as controllable text data-augmentation or prompt curation approach, enriching the diversity of the language space for generative results in a manageable way. Thus, an audio reasoning architecture based on a question/answer design, or a text-based audio generation framework (e.g., AudioLDM, AudioGen, etc.) may be improved by the explored sound graphs.

Figure 5:
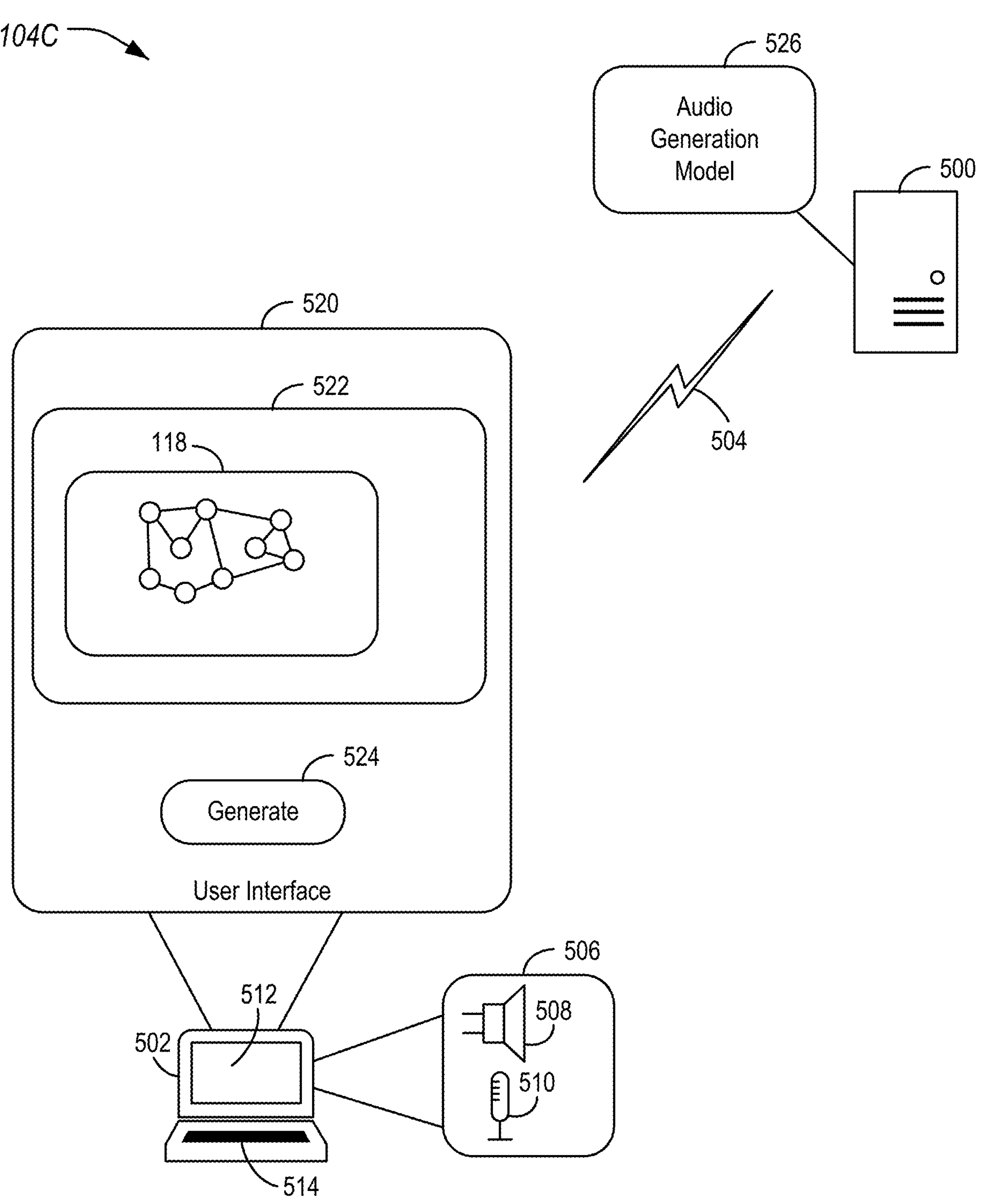
FIG. 5 illustrates an example downstream application for knowledge-guided audio generation.

FIG. 5 illustrates an example downstream application 104 for knowledge-guided audio generation 104C. The knowledge-guided audio generation 104C may be provided as part of cloud-based server 500 configured to communicate with a computing device 502 via wireless communication link 504. The computing device 502 may include but is not limited to a laptop, a tablet, a smartphone, a smart watch or other wearable, and/or a desktop computer. Among other components, the computing device 502 may include various components, such as an audio system 506 having a speaker 508 or other audio output device and/or a microphone 510 or other audio input device, a monitor 512 or other output device for displaying information, and/or a keyboard 514 or other input device for receiving user input.

The knowledge-guided audio generation 104C may be accessible via a user interface 520. The user interface 520 may include a knowledge graph editor 522 configured to display the knowledge graph 118 for which audio is to be generated. The knowledge graph editor 522 may also support other functions, such as providing for the substitution of nodes 114 in the knowledge graph 118 for different nodes 114. As one possibility, to continue the example 200 of FIG. 2, the grounding object may be changed from "wood" to "metal," to indicate a different material for the "door." This may allow for the sound that is generated to be adjusted graphically and at a node 114 level.

The user may then select a generate control 524 to provide the knowledge graph 118 over the communication link 504 to the audio generation model 526 of the cloud-based server 500 for processing. The audio generation model 526 may generate audio data based on the knowledge graph 118 as a prompt and may provide the generated audio data back to the computing device 502 over the communication link 504. In an example, the audio generation model 526 may be trained to receive the knowledge graph 118 and to generate audio based on the knowledge graph 118. Or, in another example, the knowledge graph 118 may be converted into a textual representation, the audio generation model 526 may be a text-to-audio (TTA) model, and the converted textual representation may be provided to the audio generation model 526 as a textual prompt.

The cloud-based server 500 may generate the audio data and may send the audio data to the computing device 502 over the communication link 504. The computing device 502 may accordingly receive and play the desired generated audio, e.g., using the speaker 508 of the audio system 506. The computing device 502 may also additionally or alternatively store the generated audio data in a memory device of the computing device 502.

In another example, at least some of the features of the cloud-based server 500 may be stored on the computing device 502. For example, the computing device 502 may locally include the audio generation model 526 that is stored and executed by the computing device 502 to generate the desired audio locally at the computing device 502. While specific implementations of the downstream applications 104 are provided herein, the downstream applications 104 may be implemented in other suitable ways.

Figure 6:
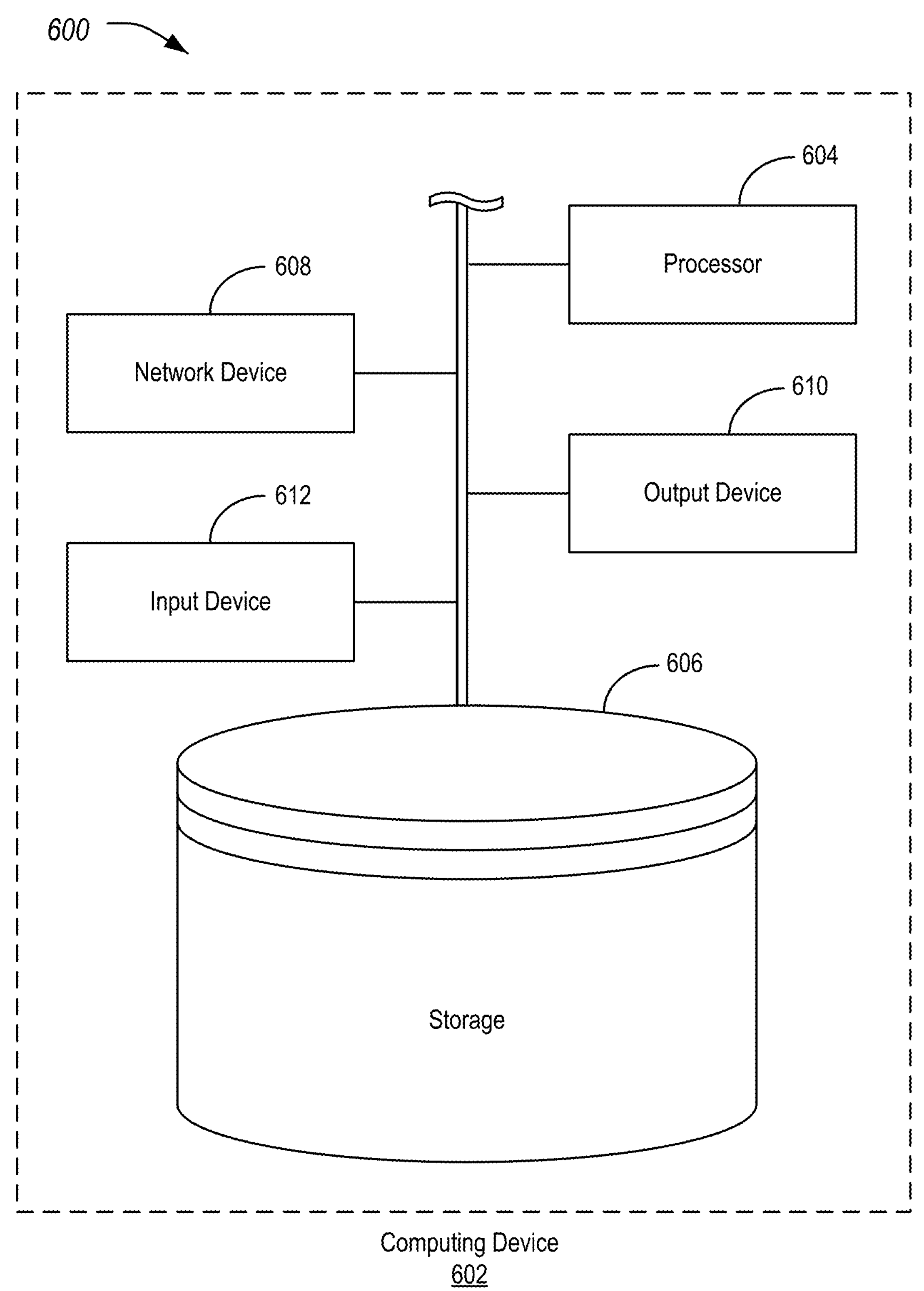
FIG. 6 illustrates an example computing device for performing the knowledge-based audio-text modeling via automatic multimodal graph construction.

FIG. 6 illustrates an example 600 of a computing device 602 for use in performing the knowledge-based audio-text modeling via automatic multimodal graph construction. As shown, the computing device 602 includes a processor 604 that is operatively connected to a storage 606, a network device 608, an output device 610, and an input device 612. This is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the framework 100.

The GPU may include hardware and software for display of at least two-dimensional (2D) and optionally 3D graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the devices to send and/or receive data from external devices over networks. Examples of suitable network devices 608 include an Ethernet interface, a Wi-Fi transceiver, a cellular transceiver, or a BLUETOOTH or BLE transceiver, UWB transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as application specific integrated circuit (ASIC), field-programmable gate array (FPGA), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for knowledge-based audio-text modeling via automatic multimodal graph construction, comprising:

receiving an audio dataset, the audio dataset including clips of audio data, wherein each of the clips of the audio data is paired with corresponding metadata descriptive of audio contents of the respective clip;

identifying graph nodes of interest from a semantic network, the graph nodes being descriptive of semantics of a knowledge domain of the audio dataset;

utilizing a large language model (LLM) for categorizing the metadata into the graph nodes and for inferring supplemental data for the graph nodes for which there is no metadata, producing an extracted knowledge graph;

validating the extracted knowledge graph utilizing the LLM to perform relation verification of edges between the graph nodes of the extracted knowledge graph, thereby mitigating hallucination effects in the categorizing and inferring of the supplemental data; and utilizing the knowledge graph, as validated, for a downstream application, including providing the knowledge graph to an audio generation model as a prompt to generate audio data based on the knowledge graph.

2. The method of claim 1, wherein the metadata includes human annotations describing the audio contents of the respective clips of the audio data.

3. The method of claim 1, wherein the metadata includes machine-learned labels, attributes, and/or other forms of recognition outcomes inferred from audio and/or speech data using one or more machine learning models.

4. The method of claim 1, wherein the graph nodes of interest are one or more of: defined based on user knowledge of the knowledge domain, queried from the semantic network as graph nodes describing semantics of the knowledge domain; extracted from a database of domain knowledge; received from the LLM responsive to a prompt for relevant graph nodes for the knowledge domain.

5. The method of claim 1, wherein inferring the supplemental data includes receiving the supplemental data from the LLM responsive to a prompt for requesting the LLM to infer content for names of the graph nodes for which there is no metadata available.

6. The method of claim 1, wherein the downstream application includes an audio classification application using the knowledge graph for sound event detection and/or audio tagging.

7. The method of claim 1, wherein the downstream application includes an audio captioning application using the knowledge graph for audio retrieval.

8. The method of claim 1, wherein the downstream application includes representing the knowledge graph as an adjacency matrix to perform multimodal graph representation learning.

9. The method of claim 1, wherein the downstream application includes using the knowledge graph to define knowledge-based clusters for contrastive learning.

10. The method of claim 1, wherein the downstream application includes using the knowledge graph to curate controllable prompts, captions, and/or descriptive contents for building knowledge-guided generative models.

11. The method of claim 1, further comprising:

converting the knowledge graph into a textual representation; and providing the textual representation as a textual prompt to a text-to-audio model to generate the audio data.

12. The method of claim 1, further comprising:

displaying the knowledge graph via a knowledge graph editor;

receiving user input via the knowledge graph editor to substitute at least one node of the knowledge graph with a different node; and providing the knowledge graph, as substituted, to the audio generation model, thereby modifying a characteristic of the audio data generated by the audio generation model.

13. A system for knowledge-based audio-text modeling via automatic multimodal graph construction, comprising:

one or more hardware computing devices configured to:

receive an audio dataset, the audio dataset including clips of audio data, wherein each of the clips of the audio data is paired with corresponding metadata descriptive of the audio contents of the respective clip;

identify graph nodes of interest from a semantic network, the graph nodes being descriptive of semantics of a knowledge domain of the audio dataset;

utilize a large language model (LLM) for categorizing the metadata into the graph nodes and for inferring supplemental data for the graph nodes for which there is no metadata, producing an extracted knowledge graph;

validate the extracted knowledge graph utilizing the LLM to perform relation verification of edges between the graph nodes of the extracted knowledge graph, thereby mitigating hallucination effects in the categorizing and inferring of the supplemental data; and utilize the knowledge graph, as validated, for a downstream application, including providing the knowledge graph to an audio generation model as a prompt to generate audio data based on the knowledge graph.

14. The system of claim 13, wherein the metadata includes human annotations describing the audio contents of the respective clips of the audio data.

15. The system of claim 13, wherein the metadata includes machine-learned labels, attributes, and/or other forms of recognition outcomes inferred from audio and/or speech data using one or more machine learning models.

16. The system of claim 13, wherein the graph nodes of interest are one or more of: defined based on user knowledge of the knowledge domain, queried from the semantic network as graph nodes describing semantics of the knowledge domain; extracted from a database of domain knowledge; received from the LLM responsive to a prompt for relevant graph nodes for the knowledge domain.

17. The system of claim 13, wherein inferring the supplemental data includes receiving the supplemental data from the LLM responsive to a prompt for requesting the LLM to infer content for names of the graph nodes for which there is no metadata available.

18. The system of claim 13, wherein the downstream application includes an audio classification application using the knowledge graph for sound event detection and/or audio tagging.

19. The system of claim 13, wherein the downstream application includes an audio captioning application using the knowledge graph for audio retrieval.

20. The system of claim 13, wherein the downstream application includes representing the knowledge graph as an adjacency matrix to perform multimodal graph representation learning.

21. The system of claim 13, wherein the downstream application includes using the knowledge graph to define knowledge-based clusters for contrastive learning.

22. The system of claim 13, wherein the downstream application includes using the knowledge graph to curate controllable prompts/captions/descriptive contents for building knowledge-guided generative models.

23. A non-transitory computer-readable medium comprising instructions for a knowledge-based audio-text modeling via automatic multimodal graph construction that, when executed by one or more hardware computing devices cause the one or more hardware computing devices to perform operations including to:

receive an audio dataset, the audio dataset including clips of audio data, wherein each of the clips of the audio data is paired with corresponding metadata descriptive of the audio contents of the respective clip;

identify graph nodes of interest from a semantic network, the graph nodes being descriptive of semantics of a knowledge domain of the audio dataset;

utilize a large language model (LLM) for categorizing the metadata into the graph nodes and for inferring supplemental data for the graph nodes for which there is no metadata, producing an extracted knowledge graph;

validate the extracted knowledge graph utilizing the LLM to perform relation verification of edges between the graph nodes of the extracted knowledge graph, thereby mitigating hallucination effects in the categorizing and inferring of the supplemental data; and utilize the knowledge graph, as validated, for a downstream application, including providing the knowledge graph to an audio generation model as a prompt to generate audio data based on the knowledge graph.

* * * * *